(12) United States Patent
Turnbull et al.

(10) Patent No.: US 9,938,488 B2
(45) Date of Patent: Apr. 10, 2018

(54) PROCESS FOR RECYCLING DETERGENT POUCHES

(71) Applicant: The Procter & Gamble Company, Cincinnati, OH (US)

(72) Inventors: Nicholas Andrew Turnbull, Tyne & Wear (GB); Paul Jukes, Tyne & Wear (GB)

(73) Assignee: The Procter & Gamble Company, Cincinnati, OH (US)

( * ) Notice: Subject to any disclaimer, the term of this patent is extended or adjusted under 35 U.S.C. 154(b) by 110 days.

(21) Appl. No.: 14/962,060

(22) Filed: Dec. 8, 2015

(65) Prior Publication Data

US 2016/0177227 A1 Jun. 23, 2016

(30) Foreign Application Priority Data

Dec. 22, 2014 (EP) .................................... 14199782

(51) Int. Cl.
| | |
|---|---|
| *C11D 11/00* | (2006.01) |
| *C11D 17/04* | (2006.01) |
| *C11D 3/10* | (2006.01) |
| *B65D 65/46* | (2006.01) |
| *C11D 3/39* | (2006.01) |
| *B29B 17/02* | (2006.01) |
| *B29K 31/00* | (2006.01) |
| *B29L 31/00* | (2006.01) |

(52) U.S. Cl.
CPC ............... *C11D 3/10* (2013.01); *B29B 17/02* (2013.01); *B65D 65/46* (2013.01); *C11D 3/3942* (2013.01); *C11D 17/045* (2013.01); *B29B 2017/0217* (2013.01); *B29K 2031/04* (2013.01); *B29L 2031/7128* (2013.01); *Y02W 30/622* (2015.05)

(58) Field of Classification Search
None
See application file for complete search history.

(56) References Cited

U.S. PATENT DOCUMENTS 5,705,473 A * 1/1998 Kuroda .................... C11D 1/66
510/293
8,048,318 B1 * 11/2011 Mogan ................ B65B 69/0033
206/497

FOREIGN PATENT DOCUMENTS

| EP | 2 674 475 A1 | 12/2013 |
|---|---|---|
| WO | WO 02/42401 A1 | 5/2002 |
| WO | WO 03/044155 A1 | 5/2003 |
| WO | WO 2004/085601 A1 | 10/2004 |
| WO | WO 2014/107639 A1 | 7/2014 |

OTHER PUBLICATIONS

EP Search Report dated Jun. 17, 2015; 7 pages, Application No. 14199782.5.

* cited by examiner

*Primary Examiner* — Lorna M Douyon
(74) *Attorney, Agent, or Firm* — John T. Dipre; Steven W. Miller

(57) ABSTRACT

A process for recycling a multi-compartment water-soluble pouch including a phosphate-free bleach-containing cleaning composition and an enveloping material. The pouch includes at least two compartments. A first compartment includes a solid composition and a second compartment includes a liquid composition. The process includes the steps of: a) releasing the compositions from their respective compartments by preferably cutting open the enveloping material; b) mixing the compositions; c) adding a moisture sink to the mixture; and d) optionally drying the mixture.

8 Claims, No Drawings

PROCESS FOR RECYCLING DETERGENT POUCHES

TECHNICAL FIELD

The present invention is in the field of detergent pouches, in particular it relates to a process for treating or recycling said pouches and use of the material obtained therefrom.

BACKGROUND OF THE INVENTION

Cleaning compositions in pouch form have become increasingly popular among consumers. In the production process of such pouches, it may occur that a proportion of them do not comply with the required manufacture specifications and are therefore not suitable for sale. This could be the case for pouches produced during the start up, i.e., before the process reaches a steady state, and shut down of the process.

There is a need for dealing with these "non-suitable" pouches (herein also referred as "waste" or "rejects") for economic and more importantly, environmental reasons. The nature of the pouches makes this a complex issue. Usually pouches are constituted of a water-soluble enveloping material and a cleaning composition, having very different chemical and physical properties from one another. This complexity is increased when the pouches have more than one compartment, especially if the compartments contain compositions in different physical forms (solid and liquid) or compositions comprising incompatible ingredients.

Cleaning compositions can comprise bleach, in particular inorganic bleach, such as sodium percarbonate. Usually the bleach is found at relative high weight concentration. Sodium percarbonate is a key cleaning and stain removal technology delivering good removal of bleachable stains, at affordable cost; however incorporation of this ingredient into cleaning formulations can have associated stability issues. Sodium percarbonate is an unstable chemical ingredient, which, in presence of moisture can decompose generating initially hydrogen peroxide and subsequently water and molecular oxygen. This decomposition reaction is exothermic and autocatalytic. The stability of sodium percarbonate is more challenging in the case of phosphate-free cleaning compositions. Traditional cleaning compositions contain phosphate. In addition to being a good cleaning active, phosphate is a good moisture trap that contributes to the processability and stability of the cleaning composition. In the case of phosphate-free compositions, it is not only that the phosphate is not there to trap moisture but also that the phosphate is usually replaced by other cleaning actives that can have hygropscopic nature, in detriment of the processability and stability of the resulting composition.

Water-soluble pouches containing solid and liquid compositions in different compartments present an added complication if the pouch needs to be recycled. A way to recycle the pouch could be the separation of the solid and the liquid compositions but this process is time consuming and costly. Alternatively, the solid and liquid compositions can be mixed but they can interact with each other and can have stability issues when mixed. This could occur during the processing and storage of the mixture. It will determine the storage time and conditions thereby reducing the flexibility of the recycling process.

In light of the above discussion there is the need for an efficient process for recycling water-soluble pouches containing bleach and compositions in solid and liquid forms.

SUMMARY OF THE INVENTION

According to a first aspect of the invention, there is provided a process for recycling a multi-compartment water-soluble pouch. The pouch comprises a cleaning composition enclosed by a water-soluble enveloping material. The cleaning composition is phosphate-free and comprises bleach, preferably sodium percarbonate. The pouch comprises at least two compartments, a first compartment comprising a solid composition and a second compartment comprising a liquid composition. The bleach is preferably contained in the solid compartment.

The process of the invention comprises the steps of:
i) releasing the compositions from each compartment of the pouch by preferably cutting open the enveloping material;
ii) mixing the released compositions to create a mixture;
iii) adding a moisture sink to the mixture; and
iv) optionally drying the mixture.

The mixture resulting from the combination of the liquid and solid compositions can present thermal stability issues, linked to the bleach in particular when the bleach is sodium percarbonate or any other component which undergoes exothermoic reaction in the presence of any component of the other compartment or any other material used during the recycling process. Sodium percarbonate can be thermally unstable. Due to the presence of liquid, the mixture can also face handling and processability issues, such as reduction or loss of flowability, stickiness, clumping, etc. These problems can be ameliorated or overcome by adding a moisture sink to the mixture.

The moisture sink is a solid that has good affinity for moisture and it is able to retain the moisture. Preferably, the moisture sink has a surface area of from about 0.5 to about 5 m2/g, more preferably from about 0.8 to about 4 m2/g. The surface area is calculated using BET as detailed herein below.

Preferably the moisture sink is in particulate form and has a weight geometric mean particle size of from about 50 μm to about 300 μm, more preferably from about 100 μm to about 250 μm. Preferably the moisture sink has a low level of fines and coarse particles, in particular less than 10% by weight of the particle are above about 500 and less than 10% of the particles are below about 40 μm. These mean particle size and particle size distribution further contribute to the thermal stability of the mixture. The particle size distribution and the weight geometric mean particle size can be measured using a Malvern particle size analyser based on laser diffraction.

Inorganic materials can be used as moisture sink. The moisture sink is preferably water-soluble by "water-soluble" is herein meant a degree of solubility in water at 25° C. of 5 g/100 g or more, more preferably 25 g/100 g or more and specially 50 g/100 g or more. The moisture sink for use in the present invention is water-soluble otherwise unwanted residues could be left on cleaned items. It is also preferred that the moisture sink not only contributes to improve the thermal stability of the mixture but that also actively contributes to cleaning. This is particularly important because pouches are usually quite compact and space should preferably be taken by cleaning actives.

It has been found that light carbonate is a very suitable material for use in the present invention as moisture sink. Carbonate forms a stable monohydrate under the humidity conditions found during the recycling of the pouch. The monohydrate forms a monolayer. It is important to have carbonate with a high surface area to bind the required level of free moisture. Light carbonate has a high porosity and an irregular shape that provides a high surface area that makes light carbonate a preferred material for use herein as moisture sink.

For the purpose of this invention "light sodium carbonate", herein sometimes also referred to as "light carbonate", means sodium carbonate having a surface area of from about 0.5 to about 5 m2/g and a weight geometric mean particle size of from about 50 to about 300 μm, preferably from 100 to 250 μm with preferably less than about 10% by weight of the particles above about 500 μm and less than about 10% by weight of the particles below about 50 μm.

Preferably the liquid composition comprises non-ionic surfactant.

The level of moisture sink in the mixture is preferably from 1 to 20%, more preferably from 2 to 15% and especially from 3 to 10% by weight of the mixture. These levels have proved to provide good stability to the mixture.

After the moisture sink is added to the solid-liquid mixture, the mixture becomes thermally stable, flowable, etc. The mixture is suitable to be used to make new water-soluble pouches.

According to a second aspect of the invention, there is provided a water-soluble pouch. The pouch comprises a phosphate-free bleach-containing cleaning composition. The composition comprises a moisture sink, preferably light carbonate.

The description of the pouch according to the first aspect of the invention applies mutatis mutandis to the pouch of the second aspect of the invention.

DETAILED DESCRIPTION OF THE INVENTION

The present invention provides a process for recycling a multi-compartment water-soluble pouch. The pouch comprises a cleaning composition free of phosphate. The composition comprises bleach. The cleaning composition enclosed by an enveloping material that is water-soluble. The pouch comprises at least two compartments, a first compartment comprising a solid composition and a second compartment comprising a liquid composition. The present invention also provides a water-soluble pouch comprising a moisture sink, preferably light carbonate.

By "waste" pouch is herein meant any pouch not considered suitable for sale, either because it does not meet required manufacturing specifications or because the formulation or pouch appearance are not up to the standards required for sale. Waste pouch also includes a pouch that while possibly suitable for sale is to be disposed of for other reasons.

One of the objectives of the present invention is to provide a process for treating or recycling waste phosphate-free bleach-containing cleaning pouches, producing no or a minimum amount of residue. Another objective is to produce recycled material suitable for reuse in a cleaning pouch without adversely affecting the performance of the pouch.

The process of the invention comprises the steps of:
i) releasing the compositions from their respective compartments; releasing can be done by slitting open each of the compartments of the pouch and taking the solid and liquid compositions out of their respective compartments. The compositions are separated from the enveloping material.

Alternatively the whole pouch can be mashed up.
ii) mixing the compositions; once the liquid and solid compositions are taken out each respective compartments, they are combined to produce a mixture. Usually mixing takes place in mixing chamber comprising stirring means, these means can help the homogenization of the mixture. Suitable stirring means for use herein include rotating paddles. The mixing chamber can be provided with a single or a plurality of stirring means, acting in a co- or contra-rotating manner. This mixture comprises bleach, preferably sodium percarbonate. The mixture is thermally instable and not free flowing. The mixture is sticky and prone to caking.
iii) adding a moisture sink to the mixture; the moisture sink, preferably light carbonate, provides thermal stability to the mixture.
iv) optionally drying the mixture; and
v) optionally using the mixture resulting from step iv) to make a water-soluble pouch.

Water-Soluble-Pouch

A water-soluble cleaning pouch is a pouch containing a cleaning composition, preferably an automatic dishwashing or laundry detergent composition, and an enveloping material. The enveloping material is water-soluble and preferably a water-soluble film. Both the cleaning composition and the enveloping material are water-soluble. They readily dissolve when exposed to water in an automatic dishwashing or laundry process, preferably during the main wash.

By "multi-compartment pouch" is herein meant a pouch having at least two compartments, preferably at least three compartments, each compartment contains a composition surrounded by enveloping material. One of the compartments of the pouch comprises a solid composition, comprising bleach, preferably sodium carbonate. Another compartment of the pouch comprises a liquid composition. The compartments can be in any geometrical disposition. The different compartments can be adjacent to one another, preferably in contact with one another. Especially preferred configurations for use herein include superposed compartments (i.e. one above the other), side-by-side compartments, etc. Especially preferred from a view point of automatic dishwasher dispenser fit, pouch aging optimisation and enveloping material reduction are multi-compartment pouches having some superposed compartments and some side-by-side compartments.

Enveloping Material

The enveloping material is water soluble. By "water-soluble" is herein meant that the material has a water-solubility of at least 50%, preferably at least 75% or even at least 95%, as measured by the method set out herein after using a glass-filter with a maximum pore size of 20 microns. 50 grams--0.1 gram of enveloping material is added in a pre-weighed 400 ml beaker and 245 ml+−1 ml of distilled water is added. This is stirred vigorously on a magnetic stirrer set at 600 rpm, for 30 minutes at 20° C. Then, the mixture is filtered through a folded qualitative sintered-glass filter with a pore size as defined above (max. 20 micron).

The water is dried off from the collected filtrate by any conventional method, and the weight of the remaining material is determined (which is the dissolved or dispersed faction). Then, the % solubility can be calculated.

The enveloping material is any water-soluble material capable of enclosing the cleaning composition of the product of the invention. The enveloping material can be a polymer that has been injection moulded to provide a casing or it can be a film. Preferably the enveloping material is made of polyvinyl alcohol. Preferably the enveloping material is a water-soluble polyvinyl alcohol film.

The pouch can, for example, be obtained by injection moulding or by creating compartments using a film. The enveloping material is usually moisture permeable. The pouch of the invention is stable even when the enveloping material is moisture permeable. The liquid composition confers stability to the pouch, in terms of both interaction among the different compositions and interaction with the surrounding environment.

Preferred substances for making the enveloping material include polymers, copolymers or derivatives thereof selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Especially preferred for use herein is polyvinyl alcohol and even more preferred polyvinyl alcohol films.

Most preferred enveloping materials are PVA films known under the trade reference Monosol M8630, as sold by Kuraray, and PVA films of corresponding solubility and deformability characteristics. Other films suitable for use herein include films known under the trade reference PT film or the K-series of films supplied by Aicello, or VF-HP film supplied by Kuraray.

The enveloping material herein may comprise other additive ingredients than the polymer or polymer material and water. For example, it may be beneficial to add plasticisers, for example glycerol, ethylene glycol, diethyleneglycol, propylene glycol, dipropylene glycol, sorbitol and mixtures thereof. Preferably the enveloping material comprises glycerol as plasticisers. Other useful additives include disintegrating aids.

Moisture Sink

As indicated hereinbefore, the moisture sink has good affinity for moisture. It should preferably be a hygroscopic solid and form a stable hydrate. The moisture sink should be not only good at picking up moisture but also at retaining the moisture. By "stable hydrate" is herein meant a substance that after being conditioned (dried at 60° C., atmospheric pressure for 48 hours) is capable to pick up moisture at a level of at least 10%, preferably at least 20% and more preferably at least 40% of its weight when exposed to a relative humidity of 80% at a temperature of 25° C. and atmospheric pressure and less than 5%, preferably less than 10% of the moisture is lost when the sample is subjected to a relative humidity of 60% at a temperature of 25° C. and atmospheric pressure for 2 hours. As previously discussed the moisture sink should not only be capable of immobilizing the moisture but it should also help to keep the mixture flowable.

Certain inorganic materials can act as moisture sink, in particular when they have a surface area of from about 0.5 to about 5 m2/g and an average particle size of from about 50 to about 300 μm. Suitable inorganic materials include sulfate, silica, carbonate. Light sodium carbonate is especially preferred for use herein.

The surface area is calculated using the Brunauer, Emmett and Teller (BET) Theory. The specific surface area of a powder in $m^2/g$ can be evaluated using gas adsorption by calculating the amount of adsorbate gas corresponding to a monomolecular layer on the substrate surface.

The BET equation is $$\frac{1}{\left[v_a\left(\frac{P_0}{P}-1\right)\right]} = \frac{C-1}{v_m C}\left(\frac{P}{P_0}\right) + \frac{1}{v_m C}$$

where P is the partial pressure of the adsorbate gas, $P_0$ the saturated pressure of the adsorbate gas, $v_a$ the volume of gas adsorbed at standard temperature and pressure, $v_m$ the volume of adsorbed gas and C a dimensionless constant. The above equation is an adsorption isotherm whereby $v_a$ is measured and plotted as a function of $P/P_0$. The resulting plot is known as a BET plot and a linear relationship obtained in the range of $0.05<P/P_0<0.35$. The gradient and the y-axis intercept are used to calculate the monolayer adsorbed quantity $v_m$ and the BET constant, C. The specific surface area, $S_{BET}$ is calculated using $$S_{BET} = \frac{V_m NS}{VM}$$

where N is Avogadro's constant, S the adsorption cross section of the adsorbing species, V the molar volume of the adsorbate gas and M the mass of the sample.

The surface area is determined using a Micrometrics gas sorption analyser. The sample mass is 0.5332 g, the analysis bath temperature is 77.278 K, the equilibration interval 10 s.

Cleaning Composition

Suitable ingredients for the composition of the invention are herein below described. The composition of the invention is preferably and automatic dishwashing cleaning composition. The composition is phosphate free. By "phosphate free" herein is meant that the composition comprises less than 1%, preferably less than 0.5% and especially less than 0.1% by weight thereof of phosphate.

The following actives can be used in the pouch of the invention, in either the liquid or the solid compositions. Preferably the solid composition comprise bleach and more preferably sodium percarbonate.

Bleach System

Inorganic and organic bleaches are suitable for use herein. Inorganic bleaches include perhydrate salts such as perborate, percarbonate, perphosphate, persulfate and persilicate salts.

The inorganic perhydrate salts are normally the alkali metal salts. The inorganic perhydrate salt may be included as the crystalline solid without additional protection. Alternatively, the salt can be coated.

Alkali metal percarbonates, particularly sodium percarbonate is the preferred bleach for use herein. The percarbonate is most preferably incorporated into the products in a coated form which contributes to product stability.

Potassium peroxymonopersulfate is another inorganic perhydrate salt of utility herein.

Typical organic bleaches are organic peroxyacids, especially diperoxydodecanedioc acid, diperoxytetradecanedioc acid, and diperoxyhexadecanedioc acid. Mono- and diperazelaic acid, mono- and diperbrassylic acid are also suitable herein. Diacyl and Tetraacylperoxides, for instance dibenzoyl peroxide and dilauroyl peroxide, are other organic peroxides that can be used in the context of this invention.

Further typical organic bleaches include the peroxyacids, particular examples being the alkylperoxy acids and the arylperoxy acids. Preferred representatives are (a) peroxybenzoic acid and its ring-substituted derivatives, such as alkylperoxybenzoic acids, but also peroxy-α-naphthoic acid and magnesium monoperphthalate, (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates, and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi(6-aminopercaproic acid).

Preferably, the level of bleach in the composition of the invention is from about 1 to about 20%, more preferably from about 2 to about 15%, even more preferably from about 3 to about 12% and especially from about 4 to about 10% by weight of the composition. Preferably the second composition comprises bleach.

Bleach Activators

Bleach activators are typically organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 12 carbon atoms, in particular from 2 to 10 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), decanoyloxybenzoic acid (DOBA), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC). Bleach activators if included in the compositions of the invention are in a level of from about 0.01 to about 10%, preferably from about 0.1 to about 5% and more preferably from about 1 to about 4% by weight of the total composition. If the composition comprises bleach activator then the bleach activator is preferentially placed in the second composition.

Bleach Catalyst

The composition herein preferably contains a bleach catalyst, preferably a metal containing bleach catalyst. More preferably the metal containing bleach catalyst is a transition metal containing bleach catalyst, especially a manganese or cobalt-containing bleach catalyst.

Bleach catalysts preferred for use herein include the manganese triazacyclononane and related complexes (U.S. Pat. No. 4,246,612, U.S. Pat. No. 5,227,084); Co, Cu, Mn and Fe bispyridylamine and related complexes (U.S. Pat. No. 5,114,611); and pentamine acetate cobalt(III) and related complexes (U.S. Pat. No. 4,810,410). A complete description of bleach catalysts suitable for use herein can be found in WO 99/06521, pages 34, line 26 to page 40, line 16.

Manganese bleach catalysts are preferred for use in the composition of the invention. Especially preferred catalyst for use here is a dinuclear manganese-complex having the general formula:

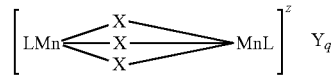

wherein Mn is manganese which can individually be in the III or IV oxidation state; each x represents a coordinating or bridging species selected from the group consisting of H2O, O22-, O2-, OH—, HO2-, SH—, S2-, >SO, Cl—, N3-, SCN—, RCOO—, NH2- and NR3, with R being H, alkyl or aryl, (optionally substituted); L is a ligand which is an organic molecule containing a number of nitrogen atoms which coordinates via all or some of its nitrogen atoms to the manganese centres; z denotes the charge of the complex and is an integer which can be positive or negative; Y is a monovalent or multivalent counter-ion, leading to charge neutrality, which is dependent upon the charge z of the complex; and q=z/[charge Y].

Preferred manganese-complexes are those wherein x is either $CH_3COO^-$ or $O^2$ or mixtures thereof, most preferably wherein the manganese is in the IV oxidation state and x is $O^{2-}$. Preferred ligands are those which coordinate via three nitrogen atoms to one of the manganese centres, preferably being of a macrocyclic nature. Particularly preferred ligands are:

(1) 1,4,7-trimethyl-1,4,7-triazacyclononane, (Me-TACN); and
(2) 1,2,4,7-tetramethyl-1,4,7-triazacyclononane, (Me-Me TACN).

The type of counter-ion Y for charge neutrality is not critical for the activity of the complex and can be selected from, for example, any of the following counter-ions: chloride; sulphate; nitrate; methylsulphate; surfactant anions, such as the long-chain alkylsulphates, alkylsulphonates, alkylbenzenesulphonates, tosylate, trifluoromethylsulphonate, perchlorate ($ClO_4^-$), $BPh_4^-$, and $PF_6^-$, though some counter-ions are more preferred than others for reasons of product property and safety.

Consequently, the preferred manganese complexes useable in the present invention are:

(I) $[(Me-TACN)Mn^{IV}(\hat{A}\mu-0)_3Mn^{IV}(Me-TACN)]^{2+}(PF_6^-)_2$
(II) $[(Me-MeTACN)Mn^{IV}(\hat{A}\mu-0)_3Mn^{IV}(Me-MeTACN)]^{2+}(PF_6^-)_2$
(III) $[(Me-TACN)Mn^{III}(\hat{A}\mu-0)(\hat{A}\mu-OAc)_2Mn^{III}(Me-TACN)]^{2+}(PF_6)_2$
(IV) $[(Me-MeTACN)Mn^{III}(\hat{A}\mu-0)(\hat{A}\mu-OAc)_2Mn^{III}(Me-MeTACN)]^{2+}(PF_6)_2$ which hereinafter may also be abbreviated as:
(I) [Mn$^{IV}_2$(Â$\mu$-O)$_3$(Me-TACN)$_2$] (PF$_6$)$_2$
(II) [Mn$^{IV}_2$(Â$\mu$-O)$_3$(Me-MeTACN)$_2$](PF$_6$)$_2$
(III) [Mn$^{III}_2$(Â$\mu$-O) (Â$\mu$-OAc)$_2$(Me-TACN)$_2$] (PF$_6$)$_2$
(IV) [Mn$^{III}_2$(Â$\mu$-O) (Â$\mu$-OAc)$_2$(Me-TACN)$_2$](PF$_6$)$_2$
The structure of I is given below:

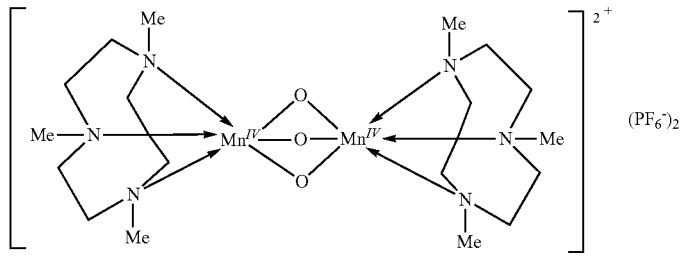

abbreviated as [Mn$^{IV}_2$(Â$\mu$-O)$_3$(Me-TACN)$_2$] (PF$_6$)$_2$.
The structure of II is given below:

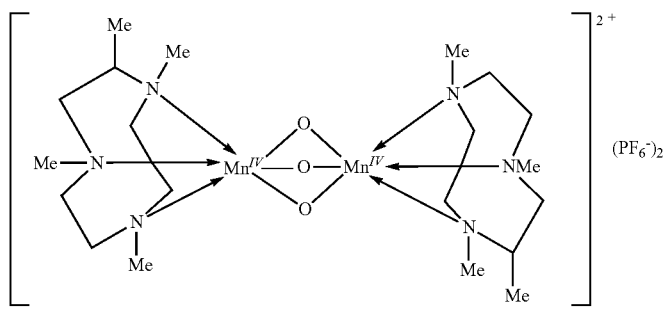

abbreviated as [Mn$^{IV}_2$(Â$\mu$-O)$_3$(Me-MeTACN)$_2$] (PF$_6$)$_2$.

It is of note that the manganese complexes are also disclosed in EP-A-0458397 and EP-A-0458398 as unusually effective bleach and oxidation catalysts. In the further description of this invention they will also be simply referred to as the "catalyst".

If bleach catalyst are included in the compositions of the invention are in a preferred level of from about 0.001 to about 10%, preferably from about 0.05 to about 2% by weight of the total composition.

Surfactant

Surfactants suitable for use herein include non-ionic surfactants, preferably the compositions are free of any other surfactants. Traditionally, non-ionic surfactants have been used in automatic dishwashing for surface modification purposes in particular for sheeting to avoid filming and spotting and to improve shine. It has been found that non-ionic surfactants can also contribute to prevent redeposition of soils.

Preferably the composition of the invention comprises a non-ionic surfactant or a non-ionic surfactant system, more preferably the non-ionic surfactant or a non-ionic surfactant system has a phase inversion temperature, as measured at a concentration of 1% in distilled water, between 40 and 70° C., preferably between 45 and 65° C. By a "non-ionic surfactant system" is meant herein a mixture of two or more non-ionic surfactants. Preferred for use herein are non-ionic surfactant systems. They seem to have improved cleaning and finishing properties and better stability in product than single non-ionic surfactants.

Phase inversion temperature is the temperature below which a surfactant, or a mixture thereof, partitions preferentially into the water phase as oil-swollen micelles and above which it partitions preferentially into the oil phase as water swollen inverted micelles. Phase inversion temperature can be determined visually by identifying at which temperature cloudiness occurs.

The phase inversion temperature of a non-ionic surfactant or system can be determined as follows: a solution containing 1% of the corresponding surfactant or mixture by weight of the solution in distilled water is prepared. The solution is stirred gently before phase inversion temperature analysis to ensure that the process occurs in chemical equilibrium. The phase inversion temperature is taken in a thermostable bath by immersing the solutions in 75 mm sealed glass test tube. To ensure the absence of leakage, the test tube is weighed before and after phase inversion temperature measurement. The temperature is gradually increased at a rate of less than 1° C. per minute, until the temperature reaches a few degrees below the pre-estimated phase inversion temperature. Phase inversion temperature is determined visually at the first sign of turbidity.

Suitable nonionic surfactants include: i) ethoxylated nonionic surfactants prepared by the reaction of a monohydroxy alkanol or alkyphenol with 6 to 20 carbon atoms with preferably at least 12 moles particularly preferred at least 16 moles, and still more preferred at least 20 moles of ethylene oxide per mole of alcohol or alkylphenol; ii) alcohol alkoxylated surfactants having a from 6 to 20 carbon atoms and at least one ethoxy and propoxy group. Preferred for use herein are mixtures of surfactants i) and ii).

Another suitable non-ionic surfactants are epoxy-capped poly(oxyalkylated) alcohols represented by the formula:

R1O[CH2CH(CH3)O]x[CH2CH2O]y[CH2CH(OH)R2]   (I)

wherein R1 is a linear or branched, aliphatic hydrocarbon radical having from 4 to 18 carbon atoms; R2 is a linear or branched aliphatic hydrocarbon radical having from 2 to 26 carbon atoms; x is an integer having an average value of from 0.5 to 1.5, more preferably about 1; and y is an integer having a value of at least 15, more preferably at least 20.

Preferably, the surfactant of formula I, at least about 10 carbon atoms in the terminal epoxide unit [CH2CH(OH) R2]. Suitable surfactants of formula I, according to the present invention, are Olin Corporation's POLY-TER-GENT® SLF-18B nonionic surfactants, as described, for example, in WO 94/22800, published Oct. 13, 1994 by Olin Corporation.

Amine oxides surfactants are useful for use in the composition of the invention. Preferred are C10-C18 alkyl dimethylamine oxide, and C10-18 acylamido alkyl dimethylamine oxide. Surfactants may be present in amounts from 0 to 15% by weight, preferably from 0.1% to 10%, and most preferably from 0.25% to 8% by weight of the total composition.

Enzymes

In describing enzyme variants herein, the following nomenclature is used for ease of reference: Original amino acid(s):position(s):substituted amino acid(s). Standard enzyme IUPAC 1-letter codes for amino acids are used.

Proteases

Suitable proteases include metalloproteases and serine proteases, including neutral or alkaline microbial serine proteases, such as subtilisins (EC 3.4.21.62) as well as chemically or genetically modified mutants thereof. Suitable proteases include subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii*.

Especially preferred proteases for the detergent of the invention are polypeptides demonstrating at least 90%, preferably at least 95%, more preferably at least 98%, even more preferably at least 99% and especially 100% identity with the wild-type enzyme from *Bacillus lentus*, comprising mutations in one or more, preferably two or more and more preferably three or more of the following positions, using the BPN' numbering system and amino acid abbreviations as illustrated in WO00/37627, which is incorporated herein by reference: V68A, N87S, S99D, S99SD, S99A, S101G, S101M, S103A, V104N/I, G118V, G118R, S128L, P129Q, S130A, Y167A, R170S, A194P, V205I and/or M222S.

Most preferably the protease is selected from the group comprising the below mutations (BPN' numbering system) versus either the PB92 wild-type (SEQ ID NO:2 in WO 08/010925) or the subtilisin 309 wild-type (sequence as per PB92 backbone, except comprising a natural variation of N87S).

(i) G118V+S128L+P129Q+S130A
(ii) S101M+G118V+S128L+P129Q+S130A
(iii) N76D+N87R+G118R+S128L+P129Q+S130A+ S188D+N248R
(iv) N76D+N87R+G118R+S128L+P129Q+S130A+ S188D+V244R
(v) N76D+N87R+G118R+S128L+P129Q+S130A
(vi) V68A+N87S+S101G+V104N Suitable commercially available protease enzymes include those sold under the trade names Savinase®, Polarzyme®, Kannase®, Ovozyme®, Everlase® and Esperase® by Novozymes A/S (Denmark), those sold under the tradename Properase®, Purafect®, Purafect Prime®, Purafect Ox®, FN3®, FN4®, Excellase®, Ultimase® and Purafect OXP® by Genencor International, those sold under the tradename Opticlean® and Optimase® by Solvay Enzymes, those available from Henkel/Kemira, namely BLAP.

Preferred levels of protease in the product of the invention include from about 0.1 to about 10, more preferably from about 0.5 to about 5 and especially from about 1 to about 4 mg of active protease per grams of product.

Amylases

Preferred enzyme for use herein includes alpha-amylases, including those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) the variants described in U.S. Pat. No. 5,856,164 and WO99/23211, WO 96/23873, WO00/60060 and WO 06/002643, especially the variants with one or more substitutions in the following positions versus the AA560 enzyme listed as SEQ ID No. 12 in WO 06/002643:
9, 26, 30, 33, 82, 37, 106, 118, 128, 133, 149, 150, 160, 178, 182, 186, 193, 195, 202, 214, 231, 256, 257, 258, 269, 270, 272, 283, 295, 296, 298, 299, 303, 304, 305, 311, 314, 315, 318, 319, 320, 323, 339, 345, 361, 378, 383, 419, 421, 437, 441, 444, 445, 446, 447, 450, 458, 461, 471, 482, 484, preferably that also contain the deletions of D183* and G184*.

(b) variants exhibiting at least 95% identity with the wild-type enzyme from *Bacillus* sp. 707 (SEQ ID NO:7 in U.S. Pat. No. 6,093,562), especially those comprising one or more of the following mutations M202, M208, S255, R172, and/or M261. Preferably said amylase comprises one of M202L or M202T mutations.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, POWERASE®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS® and PURASTAR OXAM® (Genencor International Inc., Palo Alto, Calif.) and KAM® (Kao, 14-10 Nihonbashi Kayabacho, 1-chome, Chuo-ku Tokyo 103-8210, Japan). Amylases especially preferred for use herein include NATALASE®, STAINZYME®, STAINZYME PLUS®, POWERASE® and mixtures thereof.

Preferably, the product of the invention comprises at least 0.01 mg of active amylase per gram of composition, preferably from about 0.05 to about 10, more preferably from about 0.1 to about 6, especially from about 0.2 to about 4 mg of amylase per gram of composition.

Preferably, the protease and/or amylase of the product of the invention are in the form of granulates, the granulates comprise less than 29% of efflorescent material by weight of the granulate or the efflorescent material and the active enzyme (protease and/or amylase) are in a weight ratio of less than 4:1.

Additional Enzymes

Additional enzymes suitable for use in the product of the invention can comprise one or more enzymes selected from the group comprising hemicellulases, cellulases, cellobiose dehydrogenases, peroxidases, proteases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, amylases, and mixtures thereof.

Polymer

The polymer, if present, is used in any suitable amount from about 0.1% to about 30%, preferably from 0.5% to about 20%, more preferably from 1% to 15% by weight of the composition. Sulfonated/carboxylated polymers are particularly suitable for the composition of the invention.

Suitable sulfonated/carboxylated polymers described herein may have a weight average molecular weight of less than or equal to about 100,000 Da, or less than or equal to about 75,000 Da, or less than or equal to about 50,000 Da, or from about 3,000 Da to about 50,000, preferably from about 5,000 Da to about 45,000 Da.

As noted herein, the sulfonated/carboxylated polymers may comprise (a) at least one structural unit derived from at least one carboxylic acid monomer having the general formula (I):

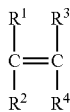

(I)

wherein $R^1$ to $R^4$ are independently hydrogen, methyl, carboxylic acid group or $CH_2COOH$ and wherein the carboxylic acid groups can be neutralized; (b) optionally, one or more structural units derived from at least one nonionic monomer having the general formula (II):

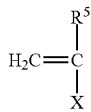

(II)

wherein $R^5$ is hydrogen, $C_1$ to $C_6$ alkyl, or $C_1$ to $C_6$ hydroxyalkyl, and X is either aromatic (with $R^5$ being hydrogen or methyl when X is aromatic) or X is of the general formula (III):

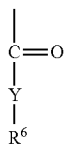

(III)

wherein $R^6$ is (independently of $R^5$) hydrogen, $C_1$ to $C_6$ alkyl, or $C_1$ to $C_6$ hydroxyalkyl, and Y is O or N; and at least one structural unit derived from at least one sulfonic acid monomer having the general formula (IV):

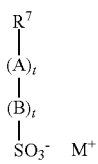

(IV)

wherein R7 is a group comprising at least one sp2 bond, A is O, N, P, S or an amido or ester linkage, B is a mono- or polycyclic aromatic group or an aliphatic group, each t is independently 0 or 1, and M+ is a cation. In one aspect, R7 is a C2 to C6 alkene. In another aspect, R7 is ethene, butene or propene.

Preferred carboxylic acid monomers include one or more of the following: acrylic acid, maleic acid, itaconic acid, methacrylic acid, or ethoxylate esters of acrylic acids, acrylic and methacrylic acids being more preferred. Preferred sulfonated monomers include one or more of the following: sodium (meth) allyl sulfonate, vinyl sulfonate, sodium phenyl(meth)allyl ether sulfonate, or 2-acrylamidomethyl propane sulfonic acid. Preferred non-ionic monomers include one or more of the following: methyl(meth)acrylate, ethyl(meth)acrylate, t-butyl(meth)acrylate, methyl (meth)acrylamide, ethyl(meth)acrylamide, t-butyl(meth) acrylamide, styrene, or α-methyl styrene.

Preferably, the polymer comprises the following levels of monomers: from about 40 to about 90%, preferably from about 60 to about 90% by weight of the polymer of one or more carboxylic acid monomer; from about 5 to about 50%, preferably from about 10 to about 40% by weight of the polymer of one or more sulfonic acid monomer; and optionally from about 1% to about 30%, preferably from about 2 to about 20% by weight of the polymer of one or more non-ionic monomer. An especially preferred polymer comprises about 70% to about 80% by weight of the polymer of at least one carboxylic acid monomer and from about 20% to about 30% by weight of the polymer of at least one sulfonic acid monomer.

The carboxylic acid is preferably (meth)acrylic acid. The sulfonic acid monomer is preferably one of the following: 2-acrylamido methyl-1-propanesulfonic acid, 2-methacrylamido-2-methyl-1-propanesulfonic acid, 3-methacrylamido-2-hydroxypropanesulfonic acid, allysulfonic acid, methallysulfonic acid, allyloxybenzenesulfonic acid, methallyloxybenzensulfonic acid, 2-hydroxy-3-(2-propenyloxy) propanesulfonic acid, 2-methyl-2-propene-1-sulfonic acid, styrene sulfonic acid, vinylsulfonic acid, 3-sulfopropyl acrylate, 3-sulfopropyl methacrylate, sulfomethylacrylamid, sulfomethylmethacrylamide, and water soluble salts thereof. The unsaturated sulfonic acid monomer is most preferably 2-acrylamido-2-propanesulfonic acid (AMPS).

Preferred commercial available polymers include: Alcosperse 240, Aquatreat AR 540 and Aquatreat MPS supplied by Alco Chemical; Acumer 3100, Acumer 2000, Acusol 587G and Acusol 588G supplied by Dow; Goodrich K-798, K-775 and K-797 supplied by BF Goodrich; and ACP 1042 supplied by ISP technologies Inc. Particularly preferred polymers are Acusol 587G and Acusol 588G supplied by Dow.

In the polymers, all or some of the carboxylic or sulfonic acid groups can be present in neutralized form, i.e. the acidic hydrogen atom of the carboxylic and/or sulfonic acid group in some or all acid groups can be replaced with metal ions, preferably alkali metal ions and in particular with sodium ions.

Other suitable polymer for use herein includes a polymer comprising an acrylic acid backbone and alkoxylated side chains, said polymer having a molecular weight of from about 2,000 to about 20,000, and said polymer having from about 20 wt % to about 50 wt % of an alkylene oxide. The polymer should have a molecular weight of from about 2,000 to about 20,000, or from about 3,000 to about 15,000, or from about 5,000 to about 13,000. The alkylene oxide (AO) component of the polymer is generally propylene oxide (PO) or ethylene oxide (EO) and generally comprises from about 20 wt % to about 50 wt %, or from about 30 wt % to about 45 wt %, or from about 30 wt % to about 40 wt % of the polymer. The alkoxylated side chains of the water soluble polymers may comprise from about 10 to about 55 AO units, or from about 20 to about 50 AO units, or from about 25 to 50 AO units. The polymers, preferably water soluble, may be configured as random, block, graft, or other known configurations. Methods for forming alkoxylated acrylic acid polymers are disclosed in U.S. Pat. No. 3,880,765.

Other suitable polymers for use herein include homopolymers and copolymers of polycarboxylic acids and their partially or completely neutralized salts, monomeric polycarboxylic acids and hydroxycarboxylic acids and their salts. Preferred salts of the abovementioned compounds are the ammonium and/or alkali metal salts, i.e. the lithium, sodium, and potassium salts, and particularly preferred salts are the sodium salts.

Suitable polycarboxylic acids are acyclic, alicyclic, heterocyclic and aromatic carboxylic acids, in which case they contain at least two carboxyl groups which are in each case separated from one another by, preferably, no more than two carbon atoms. Polycarboxylates which comprise two carboxyl groups include, for example, water-soluble salts of, malonic acid, (ethyl enedioxy) diacetic acid, maleic acid, diglycolic acid, tartaric acid, tartronic acid and fumaric acid. Polycarboxylates which contain three carboxyl groups include, for example, water-soluble citrate. Correspondingly, a suitable hydroxycarboxylic acid is, for example, citric acid. Another suitable polycarboxylic acid is the homopolymer of acrylic acid. Other suitable builders are disclosed in WO 95/01416, to the contents of which express reference is hereby made.

Other suitable polymer for use herein includes polyaspartic acid (PAS) derivatives as described in WO 2009/095645 A1.

Metal Care Agents

Metal care agents may prevent or reduce the tarnishing, corrosion or oxidation of metals, including aluminium, stainless steel and non-ferrous metals, such as silver and copper. Preferably the composition of the invention comprises from 0.1 to 5%, more preferably from 0.2 to 4% and specially from 0.3 to 3% by weight of the composition of a metal care agent, preferably the metal care agent is benzo triazole (BTA).

Glass Care Agents

Glass care agents protect the appearance of glass items during the dishwashing process. Preferably the composition of the invention comprises from 0.1 to 5%, more preferably from 0.2 to 4% and especially from 0.3 to 3% by weight of the composition of a glass care agent, preferably the glass care agent is a zinc salt.

Multi-Compartment Pouch

A multi-compartment pouch is formed by a plurality of water-soluble enveloping materials which form a plurality of compartments. The enveloping materials can have the same or different solubility profiles to allow controlled release of different ingredients. Preferably the enveloping material is a water-soluble polyvinyl alcohol film.

Preferred pouches comprise superposed compartments. This disposition contributes to the compactness, robustness and strength of the pouch, additionally, it minimise the amount of water-soluble material required. The robustness of the pouch allows also for the use of very thin films without compromising the physical integrity of the pouch. The pouch is also very easy to use because the compartments do not need to be folded to be used in machine dispensers of fix geometry.

Preferably, one compartment comprises a liquid composition and another compartment comprises a solid composition, more preferably in powder form. The solid and the liquid compositions are preferably in a weight ratio of from about 5:1 to about 1:5, more preferably from about 3:1 to about 1:2 and even more preferably from about 2:1 to about 1:1. This kind of pouch is very versatile because it can accommodate compositions having a broad spectrum of values of solid:liquid ratio.

For dispenser fit reasons, especially in an automatic dishwasher, the pouches herein should have a square or rectangular base and a height of from about 1 to about 5 cm, more preferably from about 1 to about 4 cm. Preferably the weight of the solid composition is from about 5 to about 20 grams, more preferably from about 10 to about 18 grams and the weight of the liquid compositions is from about 0.5 to about 10 grams, more preferably from about 1 to about 8 grams.

The enveloping materials which form different compartments can have different solubility, under the same conditions, releasing the content of the compositions which they partially or totally envelope at different times.

Controlled release of the ingredients of a multi-compartment pouch can be achieved by modifying the thickness and/or the solubility of the enveloping material. The solubility of the enveloping material can be delayed by for example cross-linking the film as described in WO 02/102,955 at pages 17 and 18. Other enveloping materials, in particular water-soluble films designed for rinse release are described in U.S. Pat. No. 4,765,916 and U.S. Pat. No. 4,972,017. Waxy coating (see WO 95/29982) of films can help with rinse release. pH controlled release means are described in WO 04/111178, in particular amino-acetylated polysaccharide having selective degree of acetylation.

Other means of obtaining delayed release by multi-compartment pouches with different compartments, where the compartments are made of films having different solubility are taught in WO 02/08380.

EXAMPLE

The composition of Table 1 is introduced in a two compartment layered PVA rectangular base pouch. The dual compartment pouch is made from a Monosol M8630 film as supplied by Kuraray. 17.2 g of the particulate composition and 2.2 g of the liquid composition are placed in the two different compartments of the pouch.

TABLE 1

|  | 1 |
| --- | --- |
| Particulate composition | |
| Silicate | 7.5 |
| Citrate | 25 |
| Sodium carbonate | 35 |
| Enzymes | 3 |
| Sodium Percarbonate | 15 |
| Tetraacetylethylenediamine | 8 |
| Non ionic surfactant | 0.5 |
| Sodium 1-hydroxyethylidene-1,1-diphosphonic acid | 0.5 |
| Perfume | 0.5 |
| Miscellaneous | Up to 100 |
| Liquid composition | |
| DPG | 25 |
| Non ionic surfactant | 70 |
| Glycerine | 1 |
| Dye | 0.5 |
| Miscellaneous | Up to 100 |

In order to recycle the pouches, they are fed into a hopper and along a vibrating tube to a cutting unit that breaks open the pouches. This is then feed into a dual paddle mixer. This mash exits into a sieve drum where the PVA is removed. The powder/liquid mash then exits into a bin and it is mixed with light carbonate in a ratio of 4:1. The resulting mixture is thermally stable and flowable. The mixture is then used to make water-soluble pouches.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

What is claimed is:

1. A process for recycling a multi-compartment water-soluble pouch comprising a phosphate-free bleach-containing cleaning composition and an enveloping material said pouch comprising at least two compartments, a first compartment comprising a solid composition and a second compartment comprising a liquid composition, the process comprising the steps of:
   a. releasing the compositions from their respective compartments by cutting open the enveloping material;
   b. mixing the compositions to form a mixture;
   c. adding a moisture sink to the mixture; and
   d. drying the mixture,
      wherein the moisture sink is sodium carbonate having a surface area of from about 0.5 to about 5 $m^2/g$ and weight geometric mean particle size of from about 50 to about 300 μm.

2. A process according to claim 1 wherein the moisture sink further comprises a cleaning active.

3. A process according to claim 1 wherein the level of moisture sink in the mixture resulting from step c) is from 1 to 20% by weight of the mixture.

4. A process according to claim 1 comprising the step of using the mixture resulting from step c) or d) to make a water-soluble pouch.

5. A process according to claim 1 wherein the weight ratio of solid to liquid compositions is from about 4:1 to about 1:1.

6. A process according to claim 1 wherein the cleaning composition is a laundry or an automatic dishwashing detergent.

7. A process according to claim 1 wherein the first compartment comprises sodium percarbonate.

8. A process according to claim 1 wherein the liquid composition comprises a surfactant.

* * * * *